(12) United States Patent
Martin

(10) Patent No.: US 6,746,184 B2
(45) Date of Patent: Jun. 8, 2004

(54) OFF-CENTERED MACHINE TOOL HOLDER

(76) Inventor: Kevin Norris Martin, 304 Eldredge Rd., Wells, ME (US) 04090

( * ) Notice: Subject to any disclaimer, the term of this patent is extended or adjusted under 35 U.S.C. 154(b) by 0 days.

(21) Appl. No.: 09/900,693

(22) Filed: Jul. 9, 2001

(65) Prior Publication Data

US 2003/0007840 A1 Jan. 9, 2003

(51) Int. Cl.[7] .................................................. B26D 1/12
(52) U.S. Cl. ............................................ 407/34; 407/36
(58) Field of Search .............................. 407/34, 35, 36, 407/37, 39, 44, 73; 82/1.2, 1.3, 1.5, 86

(56) References Cited

U.S. PATENT DOCUMENTS 3,381,553 A * 5/1968 Lutz
3,644,050 A * 2/1972 Schiller .................. 408/197
5,261,302 A * 11/1993 Erickson et al. ............ 82/160
5,913,643 A * 6/1999 Fowler et al. ............... 407/36
5,961,259 A * 10/1999 Ziegler ..................... 408/181

* cited by examiner

Primary Examiner—Derris H. Banks
Assistant Examiner—Ali Abdelwahed

(57) ABSTRACT

An automatic machine tool includes a stationary tool holder assembly in combination with a rotating work piece. The tool insertion opening within the tool holder is off-centered a predetermined distance from the center line to allow rotational positioning of the tool within the tool opening without requiring removing the tool holder from the assembly.

4 Claims, 2 Drawing Sheets

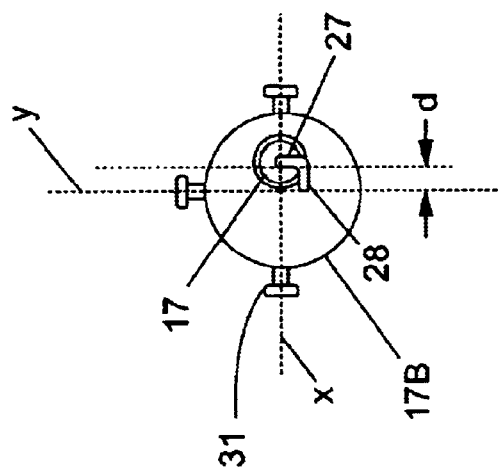
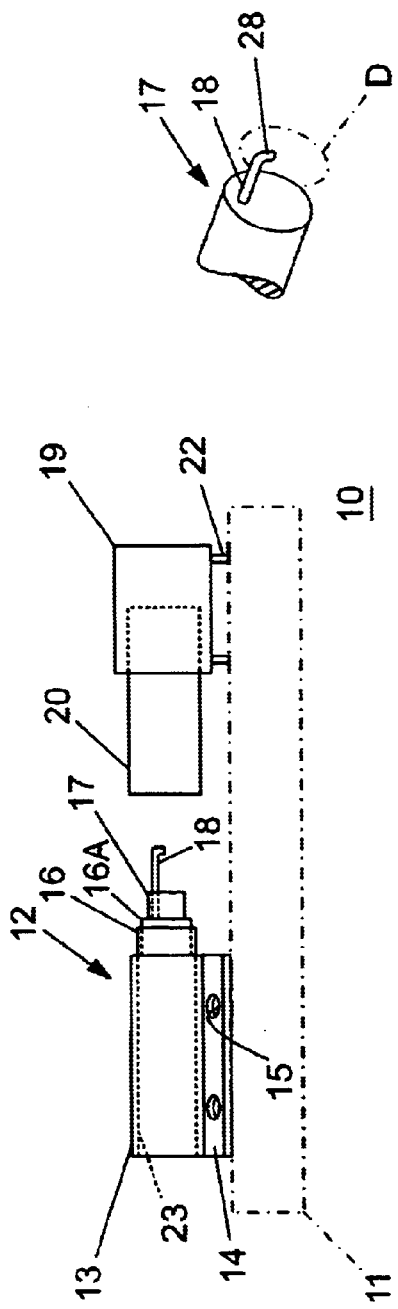
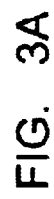

OFF-CENTERED MACHINE TOOL HOLDER

BACKGROUND OF THE INVENTION

Automatic machine lathes and the like are often utilized for forming precision parts by high-speed rotation of the metal or plastic stock against a forming tool or blade. One such high-speed turret lathe is described within U.S. Pat. No. 5,313,694 entitled "Machine Tool for Non-circular and Other Machining".

One of the problems that occurs when the tool vibrates to off-center operation, is the removal of the tool from the tool holder and the replacement of the tool in the original position within the tool holder causing a disruption in the part making process.

It would be economically advantageous, if the tool re-positioning could occur without having to remove the tool from the tool holder to expedite the part fabrication process.

Accordingly, one purpose of the invention is to provide a simple and effective arrangement for tool positioning within the tool holder without causing a delay in the part fabrication process and without incurring increased equipment costs.

SUMMARY OF THE INVENTION

An automatic machine tool includes a stationary tool assembly in combination with a rotating work piece. The tool assembly includes an outer hollow steel jacket that receives a channeled tool holder. The tool insertion opening within the tool holder is off-centered a predetermined distance from the center line through the outer jacket to allow rotational positioning of the tool within the tool opening without requiring removing the tool holder from the outer jacket.

BRIEF DESCRIPTION OF THE DRAWINGS

FIG. 1 is a side view of the machine tool assembly that includes the off-centered tool holder in accordance with the invention;

FIG. 3 is an enlarged front plan view of the off-centered tool holder in accordance with the invention; and FIG. 3A is an enlarged front perspective view of the tool holder of FIG. 3 depicting the operational range of the cutting tool within the tool holder.

DESCRIPTION OF THE PREFERRED EMBODIMENT

Figure 2:
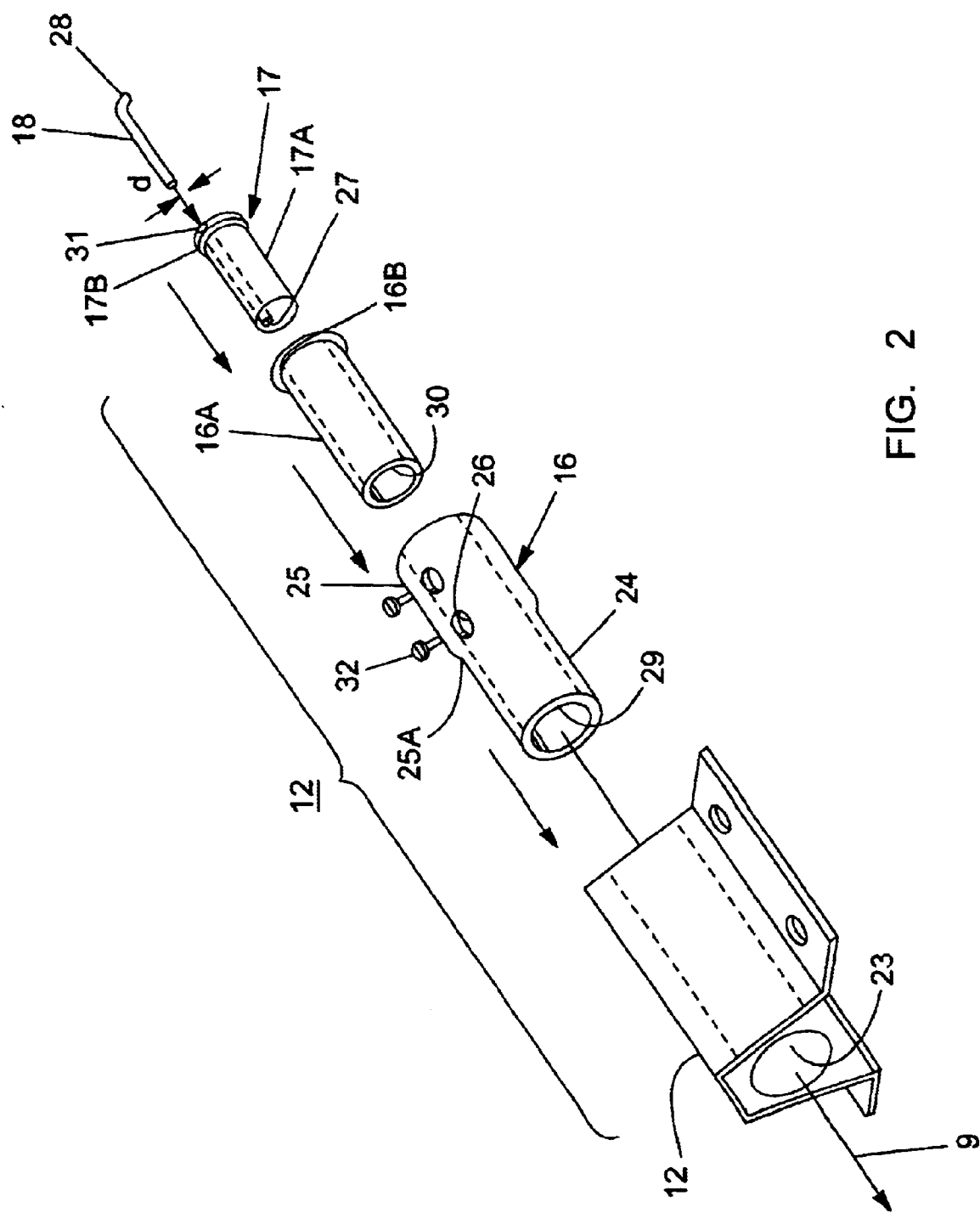
FIG. 2 is a front perspective view of the tool support assembly within the machine tool support assembly of FIG. 1.

The machine tool 10 of FIG. 1 is similar to that described within aforementioned US patent and is mounted on a worktable 11 as depicted in phantom. The tool support assembly 12 includes a steel outer jacket 13, fixedly supported on the worktable by means of bolts (not shown), and openings 15 formed through the flange 14. Another flange, not shown, is formed on the opposite side of the outer jacket. The jacket defines an inner channel or opening 23 sized to slidably receive a hollow tool sleeve 16, which includes a channeled inner sleeve 16A for receiving a tool holder 17 removably containing the cutting tool 18, to be described below in greater detail. The work piece holder 19 is slidably supported on the worktable by means of supports as indicated at 22 for moving the work piece 20, in and out of contact with the cutting tool 18.

The tool support assembly 12 is now shown in FIG. 2 to define the positional relationship between the tool assembly components shown earlier in FIG. 1. The tool support 12 is positioned such that the centerline 9 extends in a straight path through the opening 23 that receives the first diameter 24 of the tool sleeve 16. The edge 25A of the larger second diameter 25 abuts against the end of the opening 23 such that the threaded openings 26 are accessible for receiving screws 32 to prevent rotation of the inner sleeve 16A when inserted therein. The lip 16B at the end of the inner sleeve 16A abuts against the tool sleeve opening 29 and the centerline 9 is common through the tool support 12, tool sleeve 16 and the inner sleeve 16A. The first diameter 17A of the tool holder 17 is next inserted within the inner sleeve opening 30 of the inner sleeve 16A such that the perimetric lip 17B abuts against the inner sleeve opening 30 whereby the centerline 9 is common with the aforementioned components.

In accordance with the invention, the opening 27 within the tool holder 17, for receiving the cutting tool 18 retained therein by means of screws 31, is positioned off-center from the common centerline 9 by a predetermined distance d to allow the offset cutting blade 28 to be positioned over a wider range of operation without having to remove the tool holder 17 from the tool support assembly 12 as best seen by now referring to FIG. 3.

The tool holder 17 of FIG. 2 is shown in FIG. 3, with a tool opening 27 formed in the front thereof at the predetermined distance d from the geometric center of the perimetric lip 17B, described earlier. The tool 18, held within the tool opening 27 by means of screws 31, is positioned such that the cutting blade 25 is similarly offset by the distance d.

The tool holder 17 is shown in FIG. 3A to show the operational diameter D, depicted in phantom, of the tool 15 and the cutting blade 28 which is achieved by rotation of the tool holder 17 by loosening the screws 32 in the threaded openings 26 formed in the tool sleeve 16, of FIG. 2, and rotating the tool holder 17 without having to completely remove the tool holder 17 in accordance with the prior art.

A simple and inexpensive arrangement of an off-center tool opening within a tool holder for use within high-speed machine tools has herein been described. Tool adjustments can be made accordingly, without requiring removal of the tool from the too holder.

What is claimed is:

1. A holder for machine tools comprising:
   a tool holder defining a first perimeter on one end thereof, said first perimeter arranged about a center line for being received within a tool support; said center line defining an X-axis and a Y-axis, said Y-axis being perpendicular to said X-axis;
   a second end on said tool holder, opposite, said one end, said second end defining a second perimeter arranged for receiving a machine tool having an offset cutting blade;
   an opening in said second perimeter in said second end for accepting said machine tool, whereby said opening is off-set a predetermined distance along said X-axis to allow adjustment of said machine tool offset cutting blade to thereby increase area of contact between said machine tool offset cutting blade and a work piece without removing said tool holder from said tool support.

2. The holder of claim 1 wherein said opening is offset from ⅛ to ⅝ inches from said center line.

3. The holder of claim 1 including a plurality of threaded openings formed within sidewalls along said tool sleeve for retaining said machine tool within said opening.

4. A method of increasing the work area of a machine tool within a tool holder carried by a tool support comprising the steps of:
- providing a tool holder defining a center line defining an X-axis and a Y-axis, said Y-axis being perpendicular to said X-axis;
- forming an opening within one end of said tool holder off set from said center line:
  - arranging said tool holder within a tool support whereby one end of said tool holder faces a work piece;
- positioning a machine tool having an offset cutting blade within said opening opposite said work piece; and
- rotating said tool holder within said tool support to thereby increase area of contact between said machine tool offset cutting blade and a work piece without removing said tool holder from said tool support.

* * * * *